United States Patent
Meiri (10) Patent No.: US 9,959,073 B1
(45) Date of Patent: May 1, 2018

(54) DETECTION OF HOST CONNECTIVITY FOR DATA MIGRATION IN A STORAGE SYSTEM

(71) Applicant: EMC Corporation, Hopkinton, MA (US)

(72) Inventor: David Meiri, Cambridge, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 208 days.

(21) Appl. No.: 15/085,172

(22) Filed: Mar. 30, 2016

(51) Int. Cl.
*G06F 13/00* (2006.01)
*G06F 3/06* (2006.01)
*G06F 13/42* (2006.01)

(52) U.S. Cl.
CPC .......... *G06F 3/0647* (2013.01); *G06F 3/0604* (2013.01); *G06F 3/067* (2013.01); *G06F 3/0634* (2013.01); *G06F 3/065* (2013.01); *G06F 3/0619* (2013.01); *G06F 3/0683* (2013.01); *G06F 13/4239* (2013.01); *G06F 13/4243* (2013.01)

(58) Field of Classification Search
CPC .... G06F 3/0619; G06F 3/0604; G06F 3/0634; G06F 3/0647; G06F 3/065; G06F 3/067; G06F 3/0683; G06F 13/4239; G06F 13/4243
USPC ........ 711/162, 165, 173; 707/611, 613, 634, 707/781, 812, 828; 709/215, 225, 232
See application file for complete search history.

(56) References Cited

U.S. PATENT DOCUMENTS

| | | | |
|---|---|---|---|
| 4,164,763 A | 8/1979 | Briccetti et al. | |
| 4,608,839 A | 9/1986 | Tibbals, Jr. | |
| 4,821,178 A | 4/1989 | Levin et al. | |
| 5,319,645 A | 6/1994 | Bassi et al. | |
| 5,537,534 A | 7/1996 | Voigt et al. | |
| 5,539,907 A | 7/1996 | Srivastava et al. | |
| 5,627,995 A | 5/1997 | Miller et al. | |

(Continued)

FOREIGN PATENT DOCUMENTS

| | | |
|---|---|---|
| EP | 1804157 | 7/2007 |
| WO | WO 2010/019698 | 2/2010 |

(Continued)

OTHER PUBLICATIONS

Response filed on May 2, 2016 to the Non-Final Office Action dated Dec. 1, 2015; for U.S. Appl. No. 14/230,405; 8 pages.

(Continued)

*Primary Examiner* — Reba I Elmore
(74) *Attorney, Agent, or Firm* — Daly, Crowley Mofford & Durkee, LLP (57) ABSTRACT

Described embodiments provide systems and processes for performing data migration in a storage system. One or more volumes are migrated from a source device to a target device in a storage system. A discovery state of the migrated volumes is determined by one or more host devices in communication with the storage system. An initiator group is configured for each host device. Each initiator group sends at least one inquiry to each of one or more volumes of the target devices. Responses to each inquiry from each volume are tracked. The system receives a selection of one or more migrated volumes to include in a cutover operation, the selection based at least in part upon the determined discovery states. One or more volumes of the source devices associated with the included volumes are deactivated.

20 Claims, 5 Drawing Sheets

(56) References Cited

U.S. PATENT DOCUMENTS

| | | |
|---|---|---|
| 5,710,724 A | 1/1998 | Burrows |
| 5,732,273 A | 3/1998 | Srivastava et al. |
| 5,860,137 A | 1/1999 | Raz et al. |
| 5,896,538 A | 4/1999 | Blandy et al. |
| 5,903,730 A | 5/1999 | Asai et al. |
| 5,940,618 A | 8/1999 | Blandy et al. |
| 5,940,841 A | 8/1999 | Schmuck et al. |
| 5,987,250 A | 11/1999 | Subrahmanyam |
| 5,999,842 A | 12/1999 | Harrison et al. |
| 6,226,787 B1 | 5/2001 | Serra et al. |
| 6,327,699 B1 | 12/2001 | Larus et al. |
| 6,353,805 B1 | 3/2002 | Zahir et al. |
| 6,470,478 B1 | 10/2002 | Bargh et al. |
| 6,519,766 B1 | 2/2003 | Barritz et al. |
| 6,643,654 B1 | 11/2003 | Patel et al. |
| 6,654,948 B1 | 11/2003 | Konuru et al. |
| 6,658,471 B1 | 12/2003 | Berry et al. |
| 6,658,654 B1 | 12/2003 | Berry et al. |
| 6,870,929 B1 | 3/2005 | Greene |
| 7,099,797 B1 | 8/2006 | Richard |
| 7,143,410 B1 | 11/2006 | Coffman et al. |
| 7,251,683 B1 | 7/2007 | Smith |
| 7,315,795 B2 | 1/2008 | Homma |
| 7,389,497 B1 | 6/2008 | Edmark et al. |
| 7,421,681 B2 | 9/2008 | DeWitt, Jr. et al. |
| 7,552,125 B1 | 6/2009 | Evans |
| 7,574,587 B2 | 8/2009 | DeWitt, Jr. et al. |
| 7,672,005 B1 | 3/2010 | Hobbs et al. |
| 7,714,747 B2 | 5/2010 | Fallon |
| 7,814,218 B1 | 10/2010 | Knee et al. |
| 7,827,136 B1 | 11/2010 | Wang et al. |
| 7,908,436 B1 | 3/2011 | Srinivasan et al. |
| 8,200,923 B1 | 6/2012 | Healey et al. |
| 8,335,899 B1 | 12/2012 | Meiri et al. |
| 8,478,951 B1 | 7/2013 | Healey et al. |
| 9,037,822 B1 | 5/2015 | Meiri et al. |
| 9,104,326 B2 | 8/2015 | Frank et al. |
| 9,128,942 B1 | 9/2015 | Pfau et al. |
| 9,208,162 B1 | 12/2015 | Hallak et al. |
| 9,270,592 B1 | 2/2016 | Sites |
| 9,286,003 B1 | 3/2016 | Hallak et al. |
| 9,304,889 B1 | 4/2016 | Chen et al. |
| 9,330,048 B1 | 5/2016 | Bhatnagar et al. |
| 9,342,465 B1 | 5/2016 | Meiri |
| 9,378,106 B1 | 6/2016 | Ben-Moshe et al. |
| 9,396,243 B1 | 7/2016 | Halevi et al. |
| 9,418,131 B1 | 8/2016 | Halevi et al. |
| 9,762,460 B2 | 9/2017 | Pawlowski et al. |
| 9,769,254 B2 | 9/2017 | Gilbert et al. |
| 9,785,468 B2 | 10/2017 | Mitchell et al. |
| 2002/0056031 A1 | 5/2002 | Skiba et al. |
| 2003/0023656 A1 | 1/2003 | Hutchison et al. |
| 2003/0079041 A1 | 4/2003 | Parrella, Sr. et al. |
| 2003/0126122 A1 | 7/2003 | Bosley et al. |
| 2003/0145251 A1 | 7/2003 | Cantrill |
| 2004/0030721 A1 | 2/2004 | Kruger et al. |
| 2004/0267835 A1 | 12/2004 | Zwilling et al. |
| 2005/0039171 A1 | 2/2005 | Avakian et al. |
| 2005/0102547 A1 | 5/2005 | Keeton et al. |
| 2005/0125626 A1 | 6/2005 | Todd |
| 2005/0144416 A1 | 6/2005 | Lin |
| 2005/0171937 A1 | 8/2005 | Hughes et al. |
| 2005/0177603 A1 | 8/2005 | Shavit |
| 2005/0193084 A1 | 9/2005 | Todd et al. |
| 2005/0278346 A1 | 12/2005 | Shang et al. |
| 2006/0031653 A1 | 2/2006 | Todd et al. |
| 2006/0031787 A1 | 2/2006 | Ananth et al. |
| 2006/0047776 A1 | 3/2006 | Chieng et al. |
| 2006/0070076 A1 | 3/2006 | Ma |
| 2006/0123212 A1 | 6/2006 | Yagawa |
| 2006/0242442 A1 | 10/2006 | Armstrong et al. |
| 2007/0078982 A1 | 4/2007 | Aidun et al. |
| 2007/0208788 A1 | 9/2007 | Chakravarty et al. |
| 2007/0297434 A1 | 12/2007 | Arndt et al. |
| 2008/0098183 A1* | 4/2008 | Morishita ............ G06F 3/0607 711/154 |
| 2008/0163215 A1 | 7/2008 | Jiang et al. |
| 2008/0178050 A1 | 7/2008 | Kern et al. |
| 2008/0288739 A1 | 11/2008 | Bamba et al. |
| 2009/0006745 A1 | 1/2009 | Cavallo et al. |
| 2009/0030986 A1 | 1/2009 | Bates |
| 2009/0049450 A1 | 2/2009 | Dunshea et al. |
| 2009/0089483 A1 | 4/2009 | Tanaka et al. |
| 2009/0100108 A1 | 4/2009 | Chen et al. |
| 2009/0222596 A1 | 9/2009 | Flynn et al. |
| 2009/0319996 A1 | 12/2009 | Shafi et al. |
| 2010/0042790 A1 | 2/2010 | Mondal et al. |
| 2010/0180145 A1 | 7/2010 | Chu |
| 2010/0199066 A1 | 8/2010 | Artan et al. |
| 2010/0205330 A1 | 8/2010 | Noborikawa et al. |
| 2010/0223619 A1 | 9/2010 | Jaquet et al. |
| 2010/0257149 A1 | 10/2010 | Cognigni et al. |
| 2011/0060722 A1 | 3/2011 | Li et al. |
| 2011/0078494 A1 | 3/2011 | Maki et al. |
| 2011/0083026 A1 | 4/2011 | Mikami et al. |
| 2011/0099342 A1 | 4/2011 | Ozdemir |
| 2011/0119679 A1 | 5/2011 | Muppirala et al. |
| 2011/0161297 A1 | 6/2011 | Parab |
| 2011/0202744 A1 | 8/2011 | Kulkarni et al. |
| 2011/0225122 A1 | 9/2011 | Denuit et al. |
| 2012/0054472 A1 | 3/2012 | Altman et al. |
| 2012/0059799 A1 | 3/2012 | Oliveira et al. |
| 2012/0078852 A1 | 3/2012 | Haselton et al. |
| 2012/0124282 A1 | 5/2012 | Frank et al. |
| 2012/0158736 A1 | 6/2012 | Milby |
| 2012/0278793 A1 | 11/2012 | Jalan et al. |
| 2012/0290546 A1 | 11/2012 | Smith et al. |
| 2012/0290798 A1 | 11/2012 | Huang et al. |
| 2012/0304024 A1 | 11/2012 | Rohleder et al. |
| 2013/0031077 A1 | 1/2013 | Liu et al. |
| 2013/0054524 A1 | 2/2013 | Anglin et al. |
| 2013/0073527 A1 | 3/2013 | Bromley |
| 2013/0110783 A1 | 5/2013 | Wertheimer et al. |
| 2013/0111007 A1 | 5/2013 | Hoffmann et al. |
| 2013/0138607 A1 | 5/2013 | Bashyam et al. |
| 2013/0151683 A1 | 6/2013 | Jain et al. |
| 2013/0151759 A1 | 6/2013 | Shim et al. |
| 2013/0198854 A1 | 8/2013 | Erway et al. |
| 2013/0246724 A1 | 9/2013 | Furuya |
| 2013/0265883 A1 | 10/2013 | Henry et al. |
| 2013/0282997 A1 | 10/2013 | Suzuki et al. |
| 2013/0318051 A1 | 11/2013 | Kumar et al. |
| 2013/0332610 A1 | 12/2013 | Beveridge |
| 2014/0040199 A1 | 2/2014 | Golab et al. |
| 2014/0040343 A1* | 2/2014 | Nickolov ............... G06F 9/4856 709/201 |
| 2014/0136759 A1 | 5/2014 | Sprouse et al. |
| 2014/0143206 A1 | 5/2014 | Pittelko |
| 2014/0161348 A1 | 6/2014 | Sutherland et al. |
| 2014/0195484 A1 | 7/2014 | Wang et al. |
| 2014/0237201 A1 | 8/2014 | Swift |
| 2014/0297588 A1 | 10/2014 | Babashetty et al. |
| 2014/0359231 A1 | 12/2014 | Matthews |
| 2014/0380282 A1 | 12/2014 | Ravindranath Sivalingam et al. |
| 2015/0006910 A1 | 1/2015 | Shapiro |
| 2015/0088823 A1 | 3/2015 | Chen et al. |
| 2015/0112933 A1 | 4/2015 | Satapathy |
| 2015/0149739 A1 | 5/2015 | Seo et al. |
| 2015/0161194 A1 | 6/2015 | Provenzano et al. |
| 2015/0249615 A1 | 9/2015 | Chen et al. |
| 2015/0324236 A1 | 11/2015 | Gopalan et al. |
| 2016/0034692 A1 | 2/2016 | Singler |
| 2016/0042285 A1 | 2/2016 | Gilenson et al. |
| 2016/0080482 A1 | 3/2016 | Gilbert et al. |
| 2016/0188419 A1 | 6/2016 | Dagar et al. |
| 2016/0350391 A1 | 12/2016 | Vijayan et al. |
| 2016/0359968 A1 | 12/2016 | Chitti et al. |
| 2016/0366206 A1 | 12/2016 | Shemer et al. |
| 2017/0123704 A1 | 5/2017 | Sharma et al. |

(56) References Cited

U.S. PATENT DOCUMENTS

2017/0139786 A1 5/2017 Simon et al.
2017/0161348 A1 6/2017 Araki et al.

FOREIGN PATENT DOCUMENTS

WO  WO 2010/040078  4/2010
WO  WO 2012/066528  5/2012

OTHER PUBLICATIONS

Response filed on May 2, 2016 to the Non-Final Office Action dated Feb. 4, 2016; for U.S. Appl. No. 14/037,577; 10 pages.
U.S. Appl. No. 15/196,674, filed Jun. 29, 2016, Kleiner, et al.
U.S. Appl. No. 15/196,427, filed Jun. 29, 2016, Shveidel.
U.S. Appl. No. 15/196,374, filed Jun. 29, 2016, Shveidel, et al.
U.S. Appl. No. 15/196,447, filed Jun. 29, 2016, Shveidel, et al.
U.S. Appl. No. 15/196,472, filed Jun. 29, 2016, Shveidel.
Response to U.S. Final Office Action dated Apr. 6, 2016 corresponding to U.S. Appl. No. 14/034,981; Response filed Jun. 16, 2016; 11 pages.
Notice of Allowance dated Jun. 29, 2016 corresponding to U.S. Appl. No. 14/034,981; 14 Pages.
Notice of Allowance dated May 20, 2016 corresponding to U.S. Appl. No. 14/037,577; 19 Pages.
Notice of Allowance dated Jun. 6, 2016 corresponding to U.S. Appl. No. 14/317,449; 43 Pages.
U.S. Non-Final Office Action dated Dec. 1, 2017 for U.S. Appl. No. 14/979,890; 10 Pages.
U.S. Non-Final Office Action dated Dec. 11, 2017 for U.S. Appl. No. 15/196,447; 54 Pages.
U.S. Non-Final Office Action dated Dec. 14, 2017 for U.S. Appl. No. 15/076,946; 28 Pages.
U.S. Non-Final Office Action dated Jul. 6, 2017 for U.S. Appl. No. 14/494,895; 36 Pages.
Response to U.S. Non-Final Office Action dated Jul. 6, 2017 for U.S. Appl. No. 14/494,895; Response filed Oct. 3, 2017; 10 Pages.
U.S. Appl. No. 14/034,981, filed Sep. 24, 2013, Halevi et al.
U.S. Appl. No. 14/037,577, filed Sep. 26, 2013, Ben-Moshe et al.
U.S. Appl. No. 14/230,405, filed Mar. 31, 2014, Meiri et al.
U.S. Appl. No. 14/230,414, filed Mar. 31, 2014, Meiri.
U.S. Appl. No. 14/317,449, filed Jun. 27, 2014, Halevi et al.
U.S. Appl. No. 14/494,895, filed Sep. 24, 2014, Meiri et al.
U.S. Appl. No. 14/494,899, filed Sep. 24, 2014, Chen et al.
U.S. Appl. No. 14/979,890, filed Dec. 28, 2015, Meiri et al.
U.S. Appl. No. 15/001,784, filed Jan. 20, 2016, Meiri et al.
U.S. Appl. No. 15/001,789, filed Jan. 20, 2016, Meiri et al.
U.S. Appl. No. 15/085,168, filed Mar. 30, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,181, filed Mar. 30, 2016, Meiri et al.
U.S. Appl. No. 15/085,188, filed Mar. 30, 2016, Meiri et al.
PCT International Search Report and Written Opinion dated Dec. 1, 2011 for PCT Application No. PCT/IL2011/000692; 11 Pages.
PCT International Preliminary Report dated May 30, 2013 for PCT Patent Application No. PCT/IL2011/000692; 7 Pages.
U.S. Appl. No. 12/945,915; 200 Pages.
U.S. Appl. No. 12/945,915; 108 Pages.
U.S. Appl. No. 12/945,915; 67 Pages.
Nguyen et al, "B+ Hash Tree: Optimizing Query Execution Times for on-Disk Semantic Web Data Structures;" Proceedings of the $6^{th}$ International Workshop on Scalable Semantic Web Knowledge Base Systems; Shanghai, China, Nov. 8, 2010; 16 Pages.
Notice of Allowance dated Apr. 13, 2015 corresponding to U.S. Appl. No, 14/037,511; 11 Pages.
Non-Final Office Action dated May 11, 2015 corresponding to U.S. Appl. No. 14/037,626; 13 Pages.
Response to Office Action dated May 11, 2015 corresponding to U.S. Appl. No. 14/037,626; Response filed Jul. 20, 2015; 10 Pages.
Notice of Allowance dated Oct. 26, 2015 corresponding to U.S. Appl. No. 14/037,626; 12 Pages.
Office Action dated Jul. 22, 2015 corresponding to U.S. Appl. No. 14/034,981; 28 Pages.
Response to Office Action dated Jul. 22, 2015 corresponding to U.S. Appl. No. 14/034,981; Response filed Dec. 22, 2015; 14 Pages.
Office Action dated Sep. 1, 2015 corresponding to U.S. Appl. No. 14/230,414; 13 Pages.
Response to Office Action dated Sep. 1, 2015 corresponding to U.S. Appl. No. 14/230,414; Response filed Jan. 14, 2016; 10 Pages.
Restriction Requirement dated Sep. 24, 2015 corresponding to U.S. Appl. No. 14/230,405; 8 Pages.
Response to Restriction Requirement dated Sep. 24, 2015 corresponding to U.S. Appl. No. 14/230,405;Response filed Oct. 6, 2015; 1 Page.
Office Action dated Dec. 1, 2015 corresponding to U.S. Appl. No. 14/230,405; 17 Pages.
Office Action dated Feb. 4, 2016 corresponding to U.S. Appl. No. 14/037,577; 26 Pages.
Notice of Allowance dated Feb. 10, 2016 corresponding to U.S. Appl. No. 14/494,899; 19 Pages.
Notice of Allowance dated Feb. 26, 2016 corresponding to U.S. Appl. No. 14/230,414; 8 Pages.
Final Office Action dated Apr. 6, 2016 corresponding to U.S. Appl. No. 14/034,981; 38 Pages.
U.S. Final Office Action dated Nov. 2, 2017 for U.S Appl. No. 14/494,895; 12 Pages.
Office Action dated Nov. 1, 2017 corresponding to U.S. Appl. No. 15/196,374, 64 Pages.
U.S. Non-Final Office Action dated Jan. 11, 2018 corresponding to U.S. Appl. No. 15/085,168; 14 Pages.
U.S. Non-Final Office Action dated Dec. 29, 2017 corresponding to U.S. Appl. No. 15/196,674; 34 Pages.
U.S. Non-Final Office Action dated Jan. 8, 2018 corresponding to U.S. Appl. No. 15/196,472; 16 Pages.

\* cited by examiner

DETECTION OF HOST CONNECTIVITY FOR DATA MIGRATION IN A STORAGE SYSTEM

BACKGROUND

Computer data is increasingly vital to modern organizations, and protecting against data loss in the event of a system failure is an increasingly important organization objective. Data protection systems for storing organizational source (e.g., production) site data on a periodic basis suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself is both time consuming and can consume system resources.

Some data protection systems use data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a process for performing data migration in a storage system. The system may migrate one or more volumes from a source device to a target device in a storage system. A discovery state of the migrated volumes may be determined by one or more host devices in communication with the storage system. An initiator group may be configured for each host device. Each initiator group may send at least one inquiry to each of one or more volumes of the target devices. Responses to each inquiry from each volume may be tracked. The system may receive a selection of one or more migrated volumes to include in a cutover operation, the selection based at least in part upon the determined discovery states. One or more volumes of the source devices associated with the included volumes may be deactivated.

Another aspect may provide a system including a processor and memory that stores computer program code that when executed on the processor may cause the processor to execute a data migration operation to migrate data from at least one source volume to at least one target volume in a storage system. One or more volumes may be migrated from at least one source device to at least one target device in the storage system. A discovery state may be determined of one or more of the migrated volumes by one or more host devices in communication with the storage system. To determine the discovery state, an initiator group may be configured for each of the one or more host devices. Each initiator group may send at least one inquiry to each of one or more volumes of the at least one target devices. Responses to each inquiry from each volume may be tracked. A selection may be received of one or more migrated volumes to include in a cutover operation, the selection based at least in part upon the determined discovery states. One or more volumes of the at least one source device associated with the included volumes may be deactivated.

Another aspect may provide a computer program product including a non-transitory computer readable storage medium having computer program code encoded thereon that when executed on a processor of a computer may cause the computer to execute a data migration operation to migrate data from at least one source volume to at least one target volume in a storage system. The computer program product may include computer program code for migrating one or more volumes from at least one source device to at least one target device in the storage system. A discovery state may be determined of one or more of the migrated volumes by one or more host devices in communication with the storage system. To determine the discovery state, the computer program product may include computer program code for configuring an initiator group for each of the one or more host devices. Each initiator group may send at least one inquiry to each of one or more volumes of the at least one target devices. Responses to each inquiry from each volume may be tracked. A selection may be received of one or more migrated volumes to include in a cutover operation, the selection based at least in part upon the determined discovery states. One or more volumes of the at least one source device associated with the included volumes may be deactivated.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
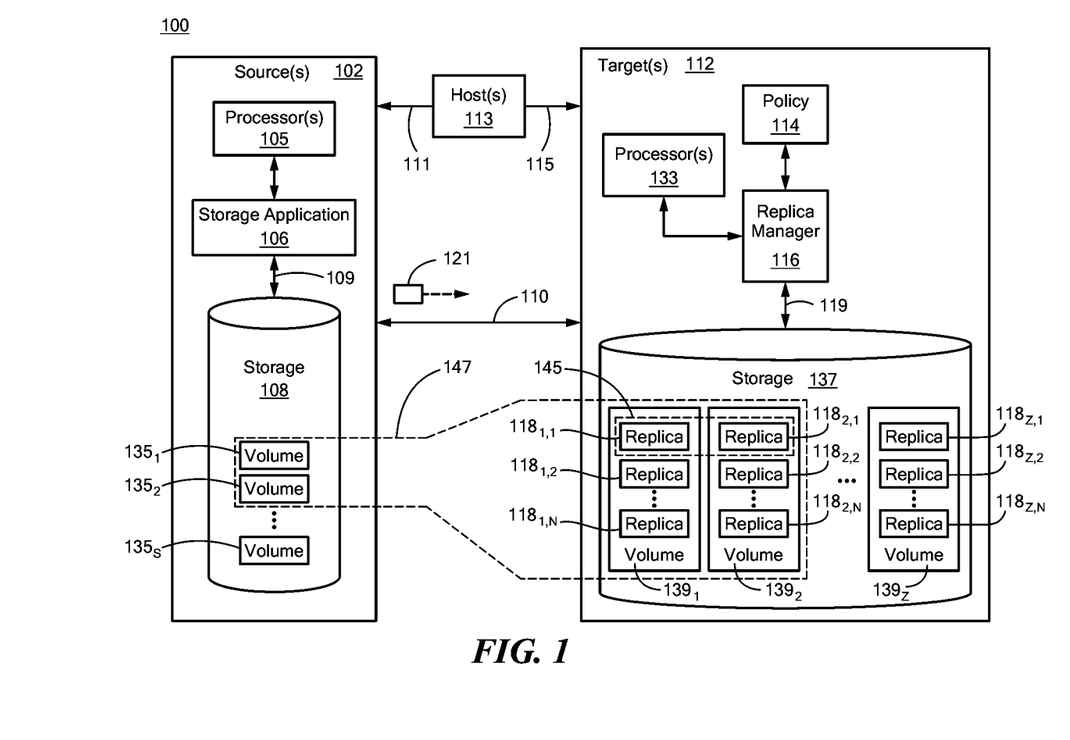
FIG. 1 is a block diagram of an example of a storage system to perform data replication from a source to a target in accordance with an illustrative embodiment.

FIG. 1 shows an example storage system 100 that may perform data migration operations, in accordance with illustrative embodiments.

Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$ that operate as active or production volumes. Target site 112 may include replica manager 116 that manages a plurality of replicas $118_{1-N}$ (generally referred to herein as replicas 118) according to a policy 114 (e.g., a replication and/or retention policy). Replicas 118 may be stored in one or more volumes $139_{1-Z}$ of storage 137 of target site 112. Target site 112 may also include one or more processors 133. Source site 102 and target site 112 may be in communication with one or more hosts 113 via communication links 111 and 115, respectively.

Hosts 113 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from hosts 113, or over time as storage system 100 operates, storage application 106 may perform data migration 121 from source site 102 to target site 112 over communication link 110. In some embodiments, communication link 110 may be a long distance communication link of a storage area network (SAN), such as an Ethernet or Internet (e.g., TCP/IP) link that may employ, for example, the iSCSI protocol. In some embodiments, one or both of source site 102 and/or target site 112 may include internal (e.g., short distance) communication links (shown as communication links 109 and 119) to transfer data between storage volumes $139_{1-Z}$ of storage 137 for storing replicas $118_{1-N}$, such as an InfiniBand (TB) link or Fibre Channel (FC) link.

In illustrative embodiments, storage system 100 may employ a snapshot (or replication) mechanism to replicate data between source site 102 and target site 112. A replica (or snapshot) may be created from data within storage 108 and transferred to one or more target sites 112 during a data replication cycle that may be performed based on data replication policies (e.g., policy 114) that may define various settings for data recovery operations. A data replication cycle may be asynchronous data replication performed at time-based intervals during operation of storage system 100, or may alternatively be synchronous data replication performed when data is changed on source site 102.

Storage system 100 may include one or more consistency groups. A consistency group 147 may include one or more volumes 135 of source site 102, each associated with a corresponding volume 139 of target site 112. Consistency group 147 may treat source volumes 135 and target volumes 139 as a single logical entity for data replication and migration. Each volume 139 may store one or more associated replicas 118 that reflect the data in the consistency group 147 at a point in time (e.g., when the replica 118 was created). For example, replicas (e.g., snapshots) 118 may be generated for each source volume 135 of consistency group 147 at the same time, and stored on associated ones of target volumes 139. As shown in FIG. 1, an illustrative consistency group 147 may include two source volumes $135_1$ and $135_2$ (135 generally) and two target volumes $139_1$ and $139_2$ (139 generally). Each target volume 139 may include one or more replicas 118. For example, volume $139_1$ may include replicas $118_{1,1}$-$118_{1,N}$, volume $139_2$ may include replicas $118_{2,1}$-$118_{2,N}$, and volume $139_Z$ may include replicas $118_{Z,1}$-$118_{Z,N}$. In some embodiments, replicas 118 for respective source volumes 135 of consistency group 147 may be grouped into sets (e.g., a snapshot set or snapset). Thus, as illustrated in FIG. 1, replica $118_{1,1}$ created for source volume $135_1$, and replica $118_{2,1}$ created for source volume $135_2$ of consistency group 147 may be included in snapset 145.

Illustrative embodiments may migrate data from one or more volumes $135_{1-s}$ of source site 102 to one or more volumes $139_{1-Z}$ of storage 137 of target site 112 in a "seamless" manner, shown as data migration 121. For example, data migration operation 121 may be said to be seamless if data is migrated from a first set of volumes of source site 102 (e.g., a first set of volumes $135_{1-S}$)) to a second set of volumes $139_{1-Z}$ of storage 137 of target site 112 while the storage system is operating and without the migrated data being unavailable to storage system 100 for other input/output (I/O) operations such as reads or writes. In other words, relocation of the data from source site 102 to target site 112 is "invisible" to users of the storage system in that the storage system is operable throughout data migration operation 121. In some embodiments, the migrated data may include snapshots (or replicas) created for data recovery.

Once the data is moved from source site 102 to target site 112 (including SCSI "personalities" of the source volumes), hosts 113 may connect to volumes $139_{1-Z}$ of target site 112, and the volumes $135_{1-S}$ of source site 102 can be deactivated (e.g., cutover). In some embodiments, a SCSI personality of a given volume may include meta-data associated with the volume. The meta-data may include, for example, one or more properties of the given volume (e.g., size, block size, transfer size, one or more features supported by the volume, etc.), one or more identifiers associated with the given volume (e.g., a volume serial number, a volume address, or vendor information of the volume) and dynamic state information of the volume (e.g., SCSI reservation state information of the volume, Asymmetric Logical Unit Access (ALUA) state information of the volume, etc.). In some embodiments, the SCSI personality meta-data may be stored in one or more inquiry pages of the volume, such as Vital Product Data (VPD) information pages of the volume. During data migration operation 121, the SCSI personalities of given ones of target volumes $139_{1-Z}$ may be matched to the SCSI personalities of associated ones of source volumes $135_{1-S}$.

In some embodiments, during data migration operation 121, storage system 100 may operate in an active/passive mode, where hosts 113 cutover from source site 102 to target site 112, such that only one of the source site 102 and the target site 112 is accessible by hosts 113. In some embodiments, during data migration operation 121, storage system 100 may operate in an active/active mode, where hosts 113 are allowed concurrent access to both source site 102 and target site 112. In the active/active mode, source site 102 (or one or more volumes 135 of source site 102) may later be disconnected and removed, and hosts 113 access only target site 112.

Described embodiments track which hosts 113 have recognized which target volumes (e.g., one or more of volumes $139_{1-Z}$ of storage 137 of target site 112) and allow a system operator to complete the data migration by performing a cutover from the source volume to the target volume (e.g., deactivation of the source volume) once all host devices have recognized all target volumes. For example, the target volumes $139_{1-Z}$ of storage 137 may store replicas 118. Other embodiments may allow the system to select certain target volumes for which to complete the data migration (e.g., perform a cutover from the source volume to the target volume). For example, the system may complete the data migration for target volumes that have been recognized by all the host devices, while waiting to complete the data migration for any target volumes that have not been recognized by all the host devices. Described embodiments prevent cutover from a source volume to a target volume before all target volumes are visible to all host devices, which can result in data loss, application and/or system failures or crashes and other system disruptions such as restarting host devices or performing volume discovery on each host 113.

Figure 2:
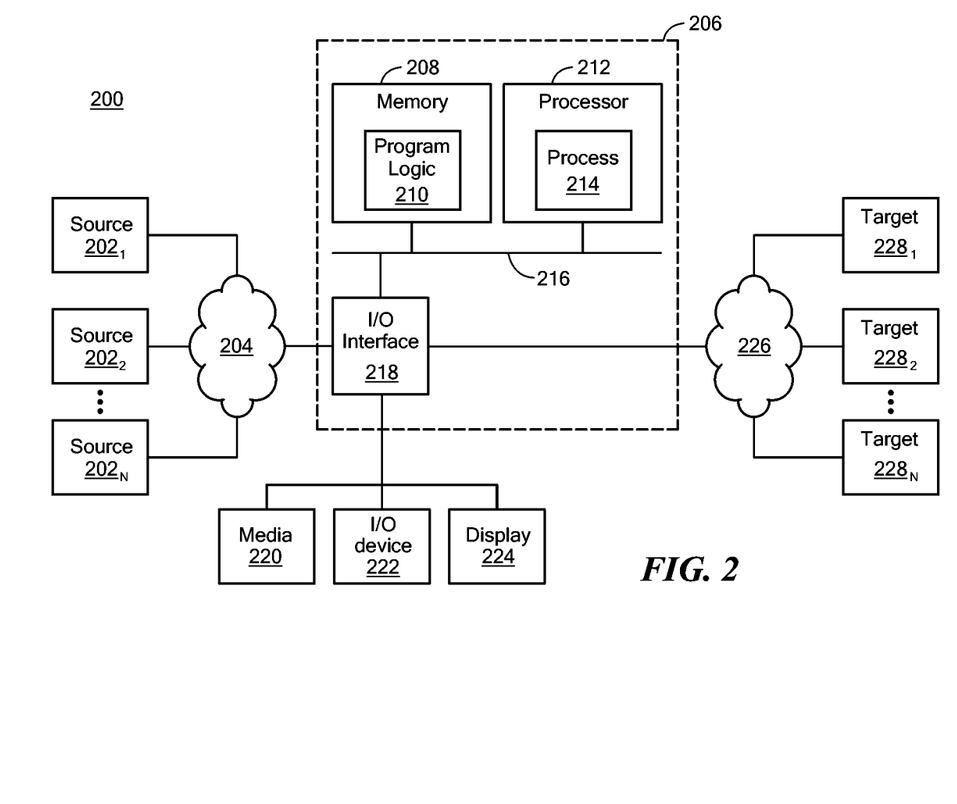
FIG. 2 is a block diagram of another example of a storage system to perform data replication from a source to a target in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via network 204. In some embodiments, communications I/O interface 218 may couple apparatus 206 to one or more target devices $228_1$-$228_Y$ via network 226. In some embodiments, network 226 of FIG. 2 may be a communication fabric between volumes of targets 228. For example, in some embodiments, network 226 may be an InfiniBand (IB) network or a Fibre Channel (FC) network.

Figure 3:
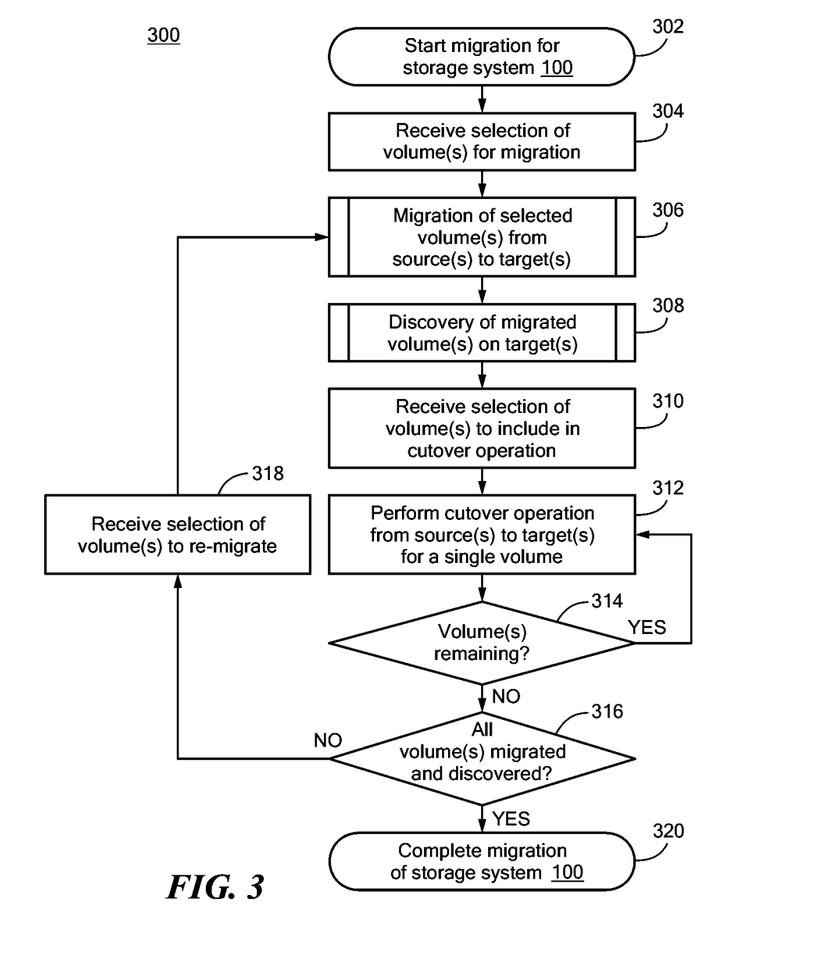
FIG. 3 is a flow diagram of an example of a process to perform data migration from a source to a target in accordance with an illustrative embodiment.

Referring to FIG. 3, process 300 is an example of a process to perform at least a part of a data migration operation of storage system 100 in accordance with illustrative embodiments. At block 302, the data migration operation of storage system 100 begins, for example when a data migration command is received by storage system 100. At block 304, storage system 100 may receive a selection of one or more volumes of storage 108 to migrate to one or more volumes of target site 112. At block 306, data migration may be performed for the selected volumes (e.g., data on each source volume is copied and stored on one or more corresponding target volumes). At block 308, discovery may be performed on the target volumes (e.g., one or more host devices are configured to communicate with the target volumes). Block 308 will be described in greater detail in conjunction with FIGS. 4 and 5.

At block 310, storage system 100 may receive a selection of one or more volumes to include in a cutover operation and, at block 312, the cutover operation may be performed for the volumes selected at block 310. For example, a cutover operation from a source volume to a target volume may allow host access only to the target volume and allow the source volume to be deactivated. As indicated by block 314, block 312 may be iteratively repeated until the selected volumes have had the cutover operation performed. At block 314, once the selected volumes have had the cutover operation performed, at block 316 storage system 100 may determine whether the volumes have been successfully migrated and discovered. If, at block 316, one or more of the volumes have not been successfully migrated and discovered, then at block 318, storage system 100 may receive a selection of one or more volumes to re-attempt data migration, and process 300 may repeat at block 306. Alternatively, at block 318, storage system 100 may receive a selection of one or more volumes to cancel data migration (e.g., to determine a cause of the data migration failure, etc.). If, at block 316, the volumes have been successfully migrated and discovered, then at block 320, data migration process 300 completes.

Figure 4:
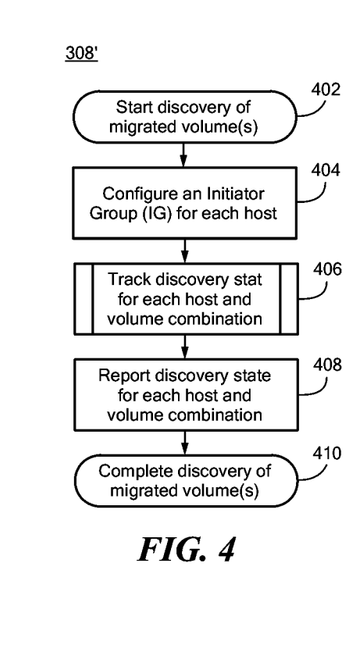
FIG. 4 is a flow diagram of an example of a process to discover volumes of the data migration process of FIG. 3 in accordance with an illustrative embodiment.

Referring to FIG. 4, process 308' is an example of a process to perform discovery of target volumes, in accordance with an illustrative embodiment. At block 402, process 308' starts. At block 404, an initiator group (IG) may be set up for each host device. An initiator group may be a group of ports (e.g., SCSI ports) on a host device (e.g., hosts 113 of FIG. 1), through which the host may send I/O operations and/or inquiry commands to a storage device (e.g., target site 112). At block 406, each host 113 (e.g., the IG for each host) may initiate sessions (e.g., send commands and/or inquiries) to the target volumes. A discovery state may be tracked for each combination of host device and target volume. As described herein, a discovery state may, for example, include an indication of whether a given host 113 has sent an inquiry to a given target volume, and whether the given host has received a response from the given target volume. For example, each command or inquiry includes information identifying host IG ports and target ports associated with the command or inquiry. In some embodiments, discovery states may be tracked for each combination of host IG port, target port and volume. Other embodiments may perform discovery state tracking for each combination of a host device and target volume. Block 406 is described in greater detail in conjunction with FIG. 5. At block 408, the discovery state may be reported for each combination of host device and target volume, for example to a user of storage system 100. As described, the user may determine which volumes to include in a cutover operation based on the reported discovery states. At block 410, discovery tracking operation 308' completes.

Figure 5:
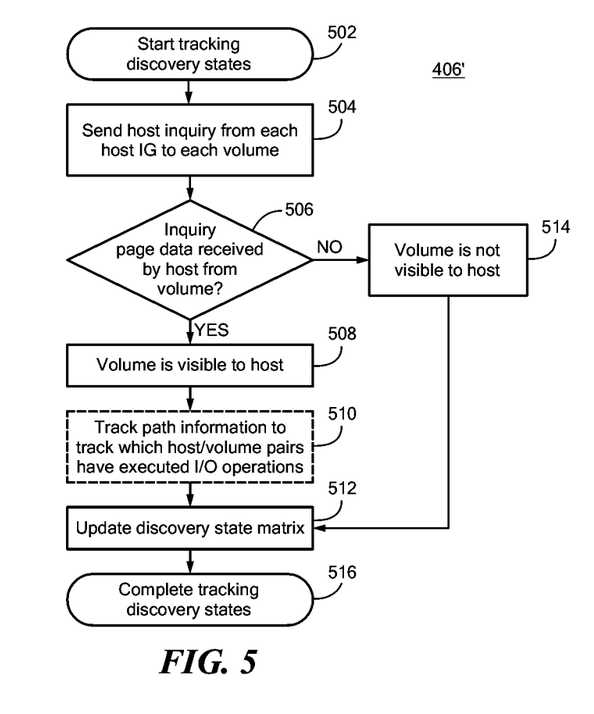
FIG. 5 is a flow diagram of an example of a process to track discovery states of the volume discovery process of FIG. 4 in accordance with an illustrative embodiment.

Referring now to FIG. 5, process 406' is an example of a process to track discovery of target volumes, in accordance with an illustrative embodiment. At block 502, process 406' starts. At block 504, each initiator group (e.g., an associated host 113) sends at least one host inquiry command to each target volume. For example, for each volume, a host may send an inquiry command through one or more of the host IG ports to one or more of the target ports. In some embodiments, the host inquiry command(s) may be one or more Small Computer System Interface (SCSI) inquiry commands that read one or more predetermined pages from a target volume. For example, each SCSI inquiry may read data from an associated inquiry page. For example, individual SCSI inquiry pages may be stored as Vital Product Data (VPD) information pages 0x80, 0x83, and/or 0xF0 of the target volume. In response to receiving one or more host inquiry commands, each target volume may respond with the data stored at the requested inquiry page for each host inquiry command. At block 506, if the host device has received inquiry page data from a target volume (e.g., a target volume has responded to the host inquiry command(s)), then at block 508 the target volume may be determined to be visible (e.g., accessible) to the host device. In other words, at blocks 506 and 508, the discovery state is verified for each volume by verifying that an inquiry (or set of inquiries) was sent from at least one of the host IG ports to at least one of the target ports, and that an associated response was sent from at least one of the target ports to at least one of the host IG ports for each inquiry.

Block 510 may optionally be performed in some embodiments, as indicated by the dashed line. At block 510, information may be tracked about the data path of the host inquiry commands and related responses. For example, one or more addresses of each host device and one or more addresses of each target device may be tracked. In an illustrative embodiment, the addresses may include network addresses and/or hardware addresses of the host devices and target devices. For example, network addresses may include IP addresses, logical unit numbers (LUNs), and other similar addresses. Hardware addresses may include media access control (MAC) addresses, World Wide Names (WWNs), or other similar addresses. Further, in some embodiments, port numbers associated with the host inquiry commands and related responses may also be tracked.

At block 512, a matrix of discovery state indicators may be updated based on the host inquiry commands and the data received in response to host inquiry commands. For example, at block 512, the matrix of discovery state indicators is updated to indicate that the host inquiry command was sent to the target volume, and that the target volume has responded. In an illustrative embodiment, a matrix of target volumes versus initiator groups may be maintained, where each cell of the matrix may include one or more discovery status indicators associated with the host device and target volume pair corresponding to the matrix cell. In accordance with illustrative embodiments, each matrix cell (Volume, IG) may include an indicator that is set when host inquiries are sent from the particular IG to the particular target volume. Each matrix cell (Volume, IG) may also include an indicator that is set when responses to the host inquiries are received by the particular IG from the particular target volume. In an illustrative embodiment, the discovery state matrix may be stored in a persistent memory of storage system 100.

At block 506, if the host device has not received inquiry page data from a target volume (e.g., a target volume has not responded to the host inquiry command), then at block 514 the target volume may be determined to not be visible (e.g., inaccessible) to the host device. At block 512, the matrix of discovery state indicators may be updated to indicate that the host inquiry command was sent to the target volume, but that the target volume has not responded. At block 516, process 406' completes.

Illustrative embodiments may validate that a host device can initiate a session with a target volume (e.g., create a data path to the target volume) after the data migration operation by tracking host inquiries from each host device to each target volume and prevent cutover if the target volumes are not fully visible.

Figure 6:
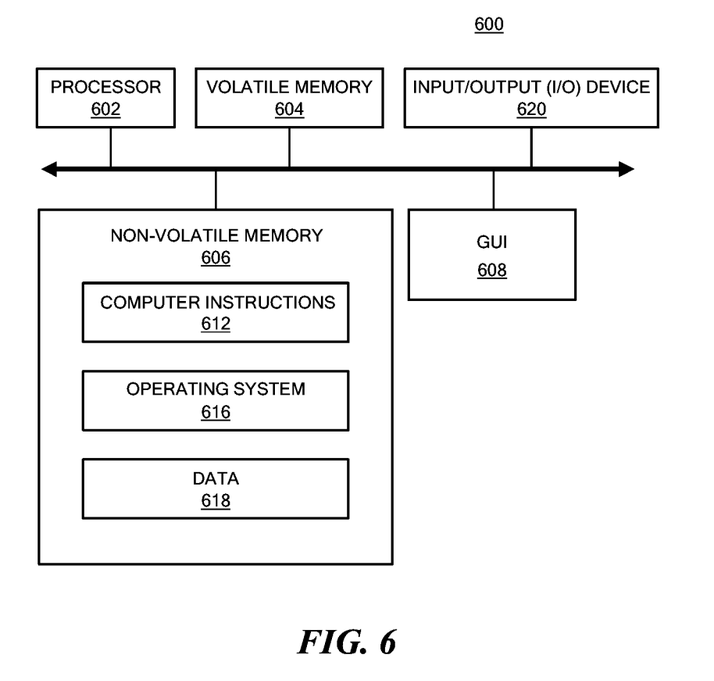
FIG. 6 is a block diagram of an example of a hardware device that may perform at least a portion of the processes in FIGS. 3, 4 and 5.

Referring to FIG. 6, in some embodiments, source site 102 and/or target site 112 may be implemented as one or more computers. Computer 600 may include processor 602, volatile memory 604 (e.g., RAM), non-volatile memory 606 (e.g., a hard disk drive, solid state drive such as a flash drive, a hybrid magnetic and solid state drive, etc.), graphical user interface (GUI) 608 (e.g., a mouse, a keyboard, a display, and so forth) and input/output (I/O) device 620. Non-volatile memory 606 stores computer instructions 612, an operating system 616 and data 618 such that, for example, the computer instructions 612 are executed by the processor 602 out of volatile memory 604 to perform at least a portion of processes 300, 308' and 406' (FIGS. 3, 4 and 5). Program code may be applied to data entered using an input device of GUI 608 or received from I/O device 620.

Processes 300, 308' and 406' (FIGS. 3, 4 and 5) are not limited to use with the hardware and software of FIG. 6 and may find applicability in any computing or processing environment and with any type of machine or set of machines that is capable of running a computer program. Processes 300, 308' and 406' may be implemented in hardware, software, or a combination of the two.

The processes described herein are not limited to the specific embodiments described. For example, processes 300, 308' and 406' are not limited to the specific processing order shown in FIGS. 3, 4 and 5. Rather, any of the blocks of processes 300, 308' and 406' may be re-ordered, combined or removed, performed in parallel or in serial, as necessary, to achieve the results set forth herein.

Processor 602 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

I claim:

1. A method comprising:
    migrating one or more volumes from at least one source device to at least one target device in a storage system;
    determining a discovery state of one or more of the migrated volumes by one or more host devices in communication with the storage system by:
        configuring an initiator group for each of the one or more host devices;
        sending at least one inquiry from each initiator group to each of one or more volumes of the at least one target device; and
        tracking responses to the at least one inquiry from each volume of the at least one target device;
    receiving a selection of one or more of the migrated volumes to include in a cutover operation, the selection based at least in part upon the determined discovery states; and
    deactivating one or more volumes of the at least one source device associated with the included volumes.

2. The method of claim 1, wherein tracking responses to each inquiry comprises:
    maintaining a matrix to store at least one discovery indicator associated with each host device and volume pair.

3. The method of claim 2, further comprising:
    determining whether each volume has: (i) full visibility, wherein the volume is visible to all host devices, (ii) partial visibility, wherein the volume is visible to less than all host devices, or (iii) no visibility, wherein the volume is not visible to any host devices.

4. The method of claim 3, further comprising:
    determining that a given volume has full visibility when the given volume has received one or more inquiries from each host device, and that each host device has received a response to the one or more inquiries from the given volume.

5. The method of claim 3, further comprising:
    performing the cutover operation for one or more volumes determined to have full visibility; and
    receiving a request to re-send at least one inquiry from at least one host device to each of one or more volumes determined to have less than full visibility.

6. The method of claim 2, further comprising:
    maintaining an inquiry indicator to track inquiries sent by each host device to each volume; and
    maintaining a response indicator to track responses received by each host device from each volume.

7. The method of claim 6, further comprising:
    tracking port addresses associated with input/output (I/O) operations of each volume.

8. The method of claim 1, wherein the inquiry comprises a request for the volume to access at least one Small Computer System Interface (SCSI) inquiry page stored on the volume.

9. The method of claim 2, further comprising:
    operating the one or more volumes in a storage area network, wherein each volume comprises at least one of: a solid state storage device, a magnetic storage device, and a hybrid magnetic and solid state storage device.

10. A system comprising:
    a processor; and
    memory storing computer program code that when executed on the processor causes the processor to execute a migration process between at least one source device and at least one target device in a storage system operable to perform the operations of:
        migrating one or more volumes from at least one source device to at least one target device in a storage system;
        determining a discovery state of one or more of the migrated volumes by one or more host devices in communication with the storage system by:
            configuring an initiator group for each of the one or more host devices;
            sending at least one inquiry from each initiator group to each of one or more volumes of the at least one target devices; and
            tracking responses to the at least one inquiry from each volume of the at least one target device;
        receiving a selection of one or more of the migrated volumes to include in a cutover operation, the selection based at least in part upon the determined discovery states; and
        deactivating one or more volumes of the at least one source device associated with the included volumes.

11. The system of claim 10, wherein the memory stores computer program code that when executed on the processor causes the processor to further perform the operation of maintaining a matrix to store at least one discovery indicator associated with each host device and volume pair.

12. The system of claim 11, wherein the memory stores computer program code that when executed on the processor causes the processor to further perform the operation of determining whether each volume has: (i) full visibility, wherein the volume is visible to all host devices, (ii) partial visibility, wherein the volume is visible to less than all host devices, or (iii) no visibility, wherein the volume is not visible to any host devices.

13. The system of claim 12, wherein the memory stores computer program code that when executed on the processor causes the processor to further perform the operation of determining that a given volume has full visibility when the given volume has received one or more inquiries from each host device, and that each host device has received a response to the one or more inquiries from the given volume.

14. The system of claim 12, wherein the memory stores computer program code that when executed on the processor causes the processor to further perform the operations of:
    performing the cutover operation for one or more volumes determined to have full visibility; and
    receiving a request to re-send at least one inquiry from at least one host device to each of one or more volumes determined to have less than full visibility.

15. The system of claim 2, wherein the memory stores computer program code that when executed on the processor causes the processor to further perform the operations of:

maintaining an inquiry indicator to track inquiries sent by each host device to each volume; and maintaining a response indicator to track responses received by each host device from each volume.

16. The system of claim 15, wherein the memory stores computer program code that when executed on the processor causes the processor to further perform the operation of tracking port addresses associated with input/output (I/O) operations of each volume.

17. The system of claim 1, wherein the inquiry comprises a request for the volume to access at least one Small Computer System Interface (SCSI) inquiry page stored on the volume.

18. A computer program product including a non-transitory computer readable storage medium having computer program code encoded thereon that when executed on a processor of a computer causes the computer to execute a migration process between at least one source device and at least one target device in a storage system, the computer program product comprising:

computer program code for migrating one or more volumes from at least one source device to at least one target device in a storage system;

computer program code for determining a discovery state of one or more of the migrated volumes by one or more host devices in communication with the storage system by:

configuring an initiator group for each of the one or more host devices;

sending at least one inquiry to each of one or more volumes of the at least one target devices; and tracking responses to the at least one inquiry from each volume of the at least one target device;

computer program code for receiving a selection of one or more of the migrated volumes to include in a cutover operation, the selection based at least in part upon the determined discovery states; and computer program code for deactivating one or more volumes of the at least one source device associated with the included volumes.

19. The computer program product of claim 18, further comprising:

computer program code for maintaining a matrix to store at least one discovery indicator associated with each host device and volume pair; and computer program code for determining whether each volume has: (i) full visibility, wherein the volume is visible to all host devices, (ii) partial visibility, wherein the volume is visible to less than all host devices, or (iii) no visibility, wherein the volume is not visible to any host devices, wherein a given volume has full visibility when the given volume has received one or more inquiries from each host device, and that each host device has received a response to the one or more inquiries from the given volume.

20. The computer program product of claim 12, further comprising:

computer program code for performing the cutover operation for one or more volumes determined to have full visibility; and computer program code for receiving a request to re-send at least one inquiry from at least one host device to each of one or more volumes determined to have less than full visibility.

\* \* \* \* \*